March 5, 1940.    L. B. M. BUCHANAN    2,192,846
REFRIGERATOR CONTROL
Filed Jan. 27, 1937

WITNESSES:

INVENTOR
LESLIE B.M. BUCHANAN.
BY
ATTORNEY

Patented Mar. 5, 1940

2,192,846

UNITED STATES PATENT OFFICE 2,192,846

REFRIGERATOR CONTROL

Leslie B. M. Buchanan, Springfield, Mass., assignor to Westinghouse Electric & Manufacturing Company, East Pittsburgh, Pa., a corporation of Pennsylvania Application January 27, 1937, Serial No. 122,505

18 Claims. (Cl. 62—4)

My invention relates to refrigerating apparatus and has for an object to provide an improved method and means for controlling such apparatus.

A further object of the invention is to maintain the mean temperature of a refrigerated zone at a substantially constant value regardless of changes in the temperature of the ambient air exterior of the zone.

A still further object of the invention is to vary the temperature of the cooling element of a refrigerated zone inversely with changes in the temperature of the atmosphere exterior of the zone.

Figure 1:
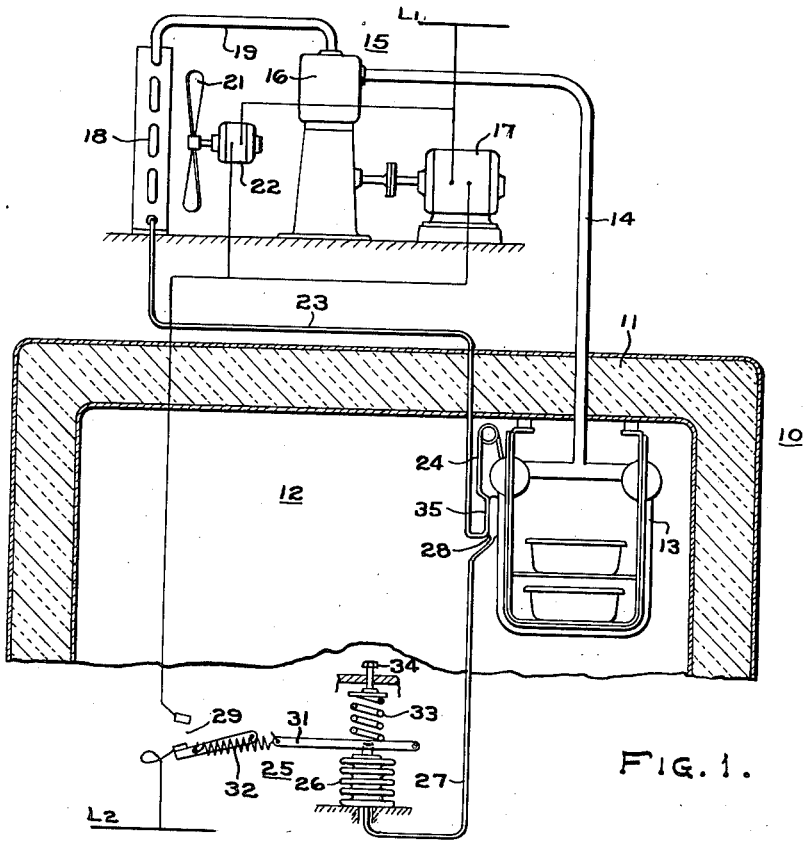
Figure 2:
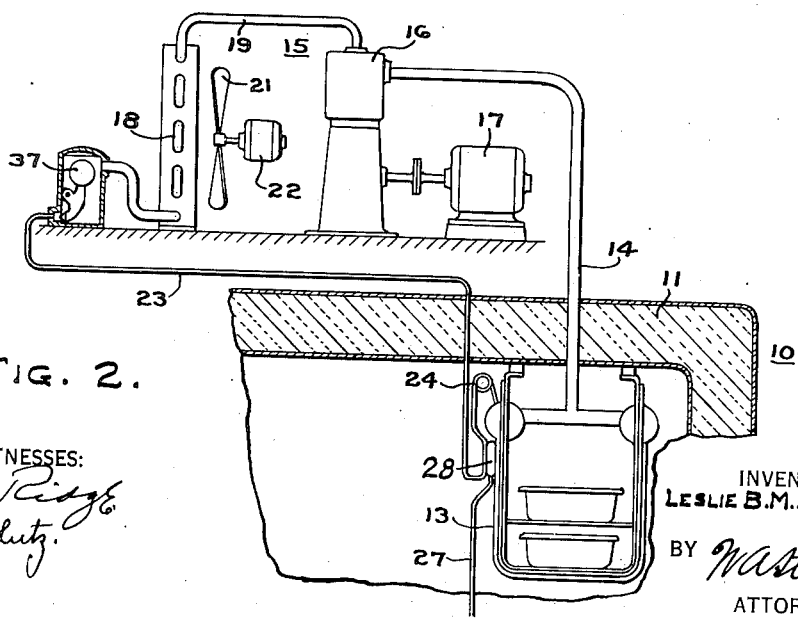

These and other objects are effected by my invention as will be apparent from the following description and claims taken in connection with the accompanying drawing, forming a part of this application, in which:

Fig. 1 is a diagrammatic view of a refrigerator controlled in accordance with my invention; and, Fig. 2 is a diagrammatic view of a part of a modified form of refrigerating machine which may be controlled in accordance with my invention.

Reference will now be had to Fig. 1 of the drawing wherein the reference numeral 10 generally designates a refrigerator having insulated walls 11 for defining a zone or cooling chamber 12. A suitable evaporator 13 is disposed in heat transfer relation with the air within the zone 12 for cooling the same.

Refrigerant vaporized in the evaporator 13 is withdrawn therefrom through a conduit 14 by means of a refrigerant condensing unit generally indicated at 15 and including a compressor 16 driven by an electric motor 17. The withdrawn vapor is compressed to a relatively high pressure by the compressor 16 and is delivered to a condenser 18 through a conduit 19. Cooling of the condenser 18 is effected by a fan 21 driven by a motor 22 that may be operated simultaneously with the motor 17. The motors 17 and 22 may be energized from a suitable source of electrical energy (not shown) through line conductors L₁ and L₂.

The high pressure vapor within the condenser 18 is cooled and condensed and is delivered to the evaporator 13 through a conduit 23 having a suitable expansion device such as, for example, a capillary tube 24 connected therein.

Operation of the condensing unit 15 may be controlled by a gas-type thermostat, generally shown at 25 and preferably responsive to the temperature of the evaporator 13. The thermostat 25 may include a bellows 26 which is connected by a tube 27 to a bulb or reservoir 28, the latter being secured in heat transfer relation with the evaporator 13 and defining the heat responsive element of the thermostat 25, as is well understood. The bulb 28, bellows 26, and tube 27 contain a volatile fluid, the pressure of which increases and decreases with increases and decreases in the temperature of the evaporator.

The thermostat 25 includes a switch 29 which is closed and opened, respectively, as the temperature of the evaporator 13 increases and decreases. As shown, the bellows 26 operates a lever 31 that is connected to the switch member 29 by an over-center spring 32 or other suitable quick-make, quick-break device. A spring 33 opposes expansion of the bellows 26 and may be adjusted by a suitable adjusting device shown at 34, whereby the mean temperature of the evaporator 13 may be varied.

The refrigerating machine described in the foregoing is of the compressor-condenser-expander type, but it will be understood that other suitable forms of refrigerating machines may be controlled in accordance with my invention. As the operation of a refrigerating machine of this type is well known, no detailed description of its operation is deemed necessary other than to say that, as the temperature of the evaporator 13 increases to a predetermined value, the thermostat 25 closes the switch 29 for energizing the motors 17 and 22 whereby operation of the condensing unit 15 is started. Opening of the thermostat switch 29 in response to a second predetermined value terminates operation of the condensing unit 15. The evaporator 13 is, therefore, maintained at a predetermined mean temperature determined by the adjustment of the thermostat spring 33.

In accordance with my invention, the mean temperature of the air within the zone or chamber 12 may be maintained at a substantially constant value regardless of changes in the temperature of the ambient atmosphere exterior of the zone for a given setting or adjustment of the thermostat 25. This operation is effected by transmitting heat at a rate which varies with the temperature of the ambient atmosphere to the heat responsive element 28 of the thermostat 25. The temperature of the condensed refrigerant varies in accordance with changes in the temperature of the ambient atmosphere and, therefore, I employ the condensed refrigerant as a heat transfer medium between the air and the thermostat. As shown, at 35, the conduit 23 may be passed in heat transfer relation with the bulb 28 or temperature responsive element of the thermostat 25.

When the temperature of the air passed over the condenser 18 increases, the temperature of the condensed refrigerant increases and the amount of heat passed to the bulb 28 is increased. Accordingly, the condensing unit 15 must operate to depress the temperature of the evaporator 13 to a lower value than before the change in temperature of the ambient atmosphere in order to reduce the temperature of the thermostat bulb 28 to the value at which operation of the unit 15 is terminated. This operation would tend to reduce the temperature of the air in the zone 12 to a lower value but the additional flow of heat through the walls 11 counteracts this tendency so that the temperature of the air remains substantially unchanged.

A reduction in the temperature of the air exterior of the cabinet walls 11 reduces the temperature of the condensed refrigerant. Accordingly, the flow of heat to the bulb 28 is reduced and the temperature of the evaporator 13 at which the condensing unit 15 is stopped is higher than before the change in the temperature of the air exterior of the cabinet. As the flow of heat through the cabinet walls is reduced, the temperature of the air in the zone remains substantially unchanged.

In accordance with the foregoing, the mean temperature of the evaporator will be relatively low when the temperature of the ambient atmosphere exterior of the cabinet is high, and, conversely, it will be relatively high when the temperature of the ambient atmosphere is low.

As the operation of my improved control system is dependent upon the relative rate of heat transfer from the capillary tube to the thermostat control bulb and from the bulb to the evaporator, any desired relation between the temperature of the refrigerated zone and the atmosphere exterior thereof may be obtained by varying the amount of thermal contact between these elements. The thermal contact or heat transfer between the elements may be such that the temperature of the air maintained in the cooling chamber 12 is reduced as the temperature of the ambient atmosphere increases and vice versa. This may be desirable in order to compensate for different service loads caused by opening of the cabinet door and by chilling food products from different initial temperatures.

In Fig. 2 I have shown an embodiment of my invention in which a float valve 37 is connected in the liquid refrigerant conduit 23 ahead of the capillary tube portion 24. Only the bulb 28 and tube 27 of the thermostat structure 25 of Fig. 1 is shown in Fig. 2 for the sake of brevity, but it will be understood that a complete thermostat structure of the type shown at 25 in Fig. 1 is employed. The float valve 37 responds to the level of the condensed refrigerant therein and operates during shut-down periods of the compressor to prevent flow of refrigerant to the capillary tube 24 and evaporator 13. The system shown in Fig. 2 operates otherwise in the same manner as described in connection with Fig. 1 so that no further comment on its operation is deemed necessary.

From the foregoing, it will be apparent that I have provided an improved method and apparatus for controlling a refrigerator wherein the temperature of the air in the food storage zone is either maintained at a substantially constant value irrespective of change in temperature of the air exterior of the zone or at a temperature that varies inversely with changes in the temperature of the exterior air.

I have shown an expansion device of the capillary type but it will be understood that other forms of expansion devices may be employed without departing from the spirit of my invention.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The method of controlling the operation of a refrigerating machine having an element for cooling a zone to be refrigerated, a condenser cooled by the atmosphere exterior of said zone and a machine for translating refrigerant through the evaporator and condenser which comprises initiating and terminating the operation of the refrigerating machine in accordance with predetermined temperatures produced by the evaporator and varying the temperature of the evaporator at which operation of the machine is stopped in accordance with changes in the temperature of the refrigerant condensed in the condenser.

2. The method of controlling the operation of a refrigerating machine having a refrigerated zone, an evaporator disposed within the zone for abstracting heat therefrom, a condenser cooled by the air exteriorly of said zone, a compressor for circulating refrigerant through the evaporator and condenser and a thermostat having an element responsive to the temperature of the evaporator which method comprises initiating and terminating operation of the compressor, respectively, in response to predetermined high and low temperatures reflected by the thermostat element, and transferring heat from the condensed refrigerant to the element of the thermostat whereby the mean temperature of the evaporator is reduced and increased as the temperature of the condensed refrigerant increases and decreases, respectively.

3. The method of controlling the operation of a refrigerating machine having a refrigerated zone, an evaporator disposed for abstracting heat from the zone, a condenser cooled by the air exteriorly of said zone, a compressor for circulating refrigerant through the evaporator and condenser and a thermostat having an element responsive to the temperature of the evaporator, which method comprises initiating and terminating operation of the compressor, respectively, in response to predetermined high and low temperatures reflected by the thermostat element, and transferring heat to the element of the thermostat at rates which vary with variations in the temperature of the air exteriorly of the zone whereby the mean temperature of the evaporator is reduced and increased as the temperature of the air exterior of the refrigerated zone increases and decreases, respectively.

4. The method of controlling the operation of a refrigerating machine having a refrigerated zone, an evaporator for abstracting heat from the zone, a condenser cooled by the air exterior of said zone, a compressor for circulating refrigerant through the evaporator and condenser and a thermostatic regulator having an element responsive to the temperature of the evaporator, which method comprises initiating and terminating operation of the compressor, respectively, in response to predetermined high and low temperatures reflected by the element of the regulator, and transferring heat between the condensed refrigerant and the element of the regulator so that the temperature within the zone at which the thermostatic regulator operates to terminate operation of the compressor is reduced and increased as the temperature of the condensed refrigerant increases and decreases, respectively.

5. In refrigerating apparatus, the combination of a zone to be refrigerated, a refrigerant evaporator disposed within said zone for abstracting heat therefrom, a condenser disposed in heat transfer relation with the ambient atmosphere exterior of said zone, means for translating refrigerant vaporized in said evaporator to the condenser, means for conveying the condensed refrigerant to the evaporator, a thermostat having an element responsive to the temperature of the evaporator for controlling the operation of the refrigerant translating means, and means for imparting heat to the element of the thermostat at rates which vary with the temperature of said ambient atmosphere.

6. In refrigerating apparatus, the combination of a zone to be refrigerated, a refrigerant evaporator for cooling said zone, a condenser disposed in heat transfer relation with the ambient atmosphere exterior of said zone, means for translating refrigerant vaporized in said evaporator to the condenser, a thermostat having an element responsive to the temperature of the evaporator for controlling the operation of the refrigerant translating means, and means for conveying condensed refrigerant from the condenser to the evaporator in heat transfer relation with the element of the thermostat.

7. The combination as claimed in claim 6 wherein said condensed refrigerant conveying means includes a capillary tube.

8. The method of controlling the operation of a mechanical refrigerator having a refrigerated compartment, an evaporator disposed in the compartment for abstracting heat therefrom, a condenser cooled by the air outside of said compartment, means for circulating refrigerant through the evaporator and condenser and a thermostatic regulator for controlling operation of the refrigerant circulating means, said regulator having an element responsive to the temperature of the evaporator, which method comprises initiating and terminating operation of the circulating means in response to predetermined high and low temperatures of the evaporator and modifying such initiation and termination of operation of the compressor by transferring heat between the refrigerant and said temperature responsive element before the refrigerant reaches the evaporator.

9. The combination of an intermittently operated refrigerating machine having a refrigerated compartment, an evaporator for abstracting heat from said compartment, a condenser cooled by the air outside of said compartment, means for circulating refrigerant through the evaporator and the condenser, a capillary tube for conveying refrigerant from the condenser to the evaporator and a thermostat for controlling the operation of said refrigerant circulating means, said thermostat having a heat-responsive element disposed in said compartment in heat-transfer relation with said capillary tube, whereby the operation of the refrigerant circulating means is varied to provide a substantially constant refrigerated temperature in said compartment irrespective of the temperature of the air outside said compartment.

10. The combination of a refrigerating machine having a refrigerated zone, an evaporator associated with the zone for abstracting heat therefrom, a condenser cooled by the air exteriorly of said zone, means for circulating refrigerant through the evaporator and the condenser, a capillary tube for controlling the flow of refrigerant between the condenser and the evaporator and a thermostatic regulator having an element responsive to the temperature of the refrigerant supplied to the evaporator after it has been vaporized for controlling the operation of the refrigerant circulating means, said temperature responsive element also being subjected to the heat of the condensed refrigerant in said capillary tube, whereby the operation of the refrigerant circulating means is varied to maintain a substantially constant temperature in the refrigerated zone irrespective of variations in temperature outside said zone.

11. The method of refrigerating an insulated zone which includes evaporating condensed refrigerant for abstracting heat from the zone, increasing the pressure of the evaporated refrigerant, transferring heat from the evaporated and compressed refrigerant to the air exteriorly of the zone for condensing the refrigerant, initiating and terminating the evaporation of refrigerant in response to respective high and low refrigerating temperatures and adjusting said temperatures at which evaporation is started and stopped in response to the temperature of the condensed refrigerant.

12. The method of refrigerating an insulated zone which includes evaporating condensed refrigerant for abstracting heat from the zone, increasing the pressure of the evaporated refrigerant, transferring heat from the evaporated and compressed refrigerant to the air exteriorly of the zone for condensing the refrigerant and terminating evaporation of refrigerant in response, conjointly, to the temperatures of condensation and evaporation of the refrigerant.

13. The method of controlling the operation of a refrigerating machine having a refrigerated zone, an evaporator for abstracting heat from the media in said zone, means for circulating refrigerant through the evaporator, and a thermostatic regulator having an element responsive to the temperature of the evaporator for controlling the operation of the refrigerant circulating means, which method includes initiating and terminating operation of the circulating means, respectively, in response to predetermined high and low temperatures of the evaporator, and providing a flow of heat from the air exteriorly of said zone to the temperature responsive element of the regulator in addition to the flow of heat from said air through the media in said zone, the rate of heat flow varying directly with changes in temperature of the air exteriorly of said zone, whereby the mean temperature of the evaporator is reduced and increased as the temperature of the air exteriorly of the refrigerated zone increases and decreases, respectively.

14. In refrigerating apparatus, the combination of a zone to be refrigerated, an evaporator for abstracting heat from the media in said zone, means for effecting vaporization of refrigerant in said evaporator, a regulator having an element responsive to the temperature of the evaporator for controlling the operation of the refrigerant vaporizing means, and a device for imparting heat directly to the regulator element at rates which vary with variations in the temperature of the ambient atmosphere.

15. The method of controlling the operation of a refrigerating machine having a refrigerated zone, an evaporating means, at least a portion of which abstracts heat from the media in said zone, means for circulating refrigerant through the evaporating means, and a thermostatic regulator having a heat-responsive element disposed in heat transfer relationship with the evaporating means for controlling operation of the refrigerant circulating means, which method includes initiating operation of the refrigerant circulating means in response to a predetermined temperature of the heat-responsive element and providing a flow of heat from the air exteriorly of said zone to the heat-responsive element of the regulator in addition to the flow of heat from said air through the media in said zone, the rate of heat flow varying with changes in temperature of the air exteriorly of said zone, whereby the mean temperature of the evaporating means is reduced and increased as the temperature of the air exteriorly of the refrigerated zone increases and decreases, respectively.

16. The method of controlling operation of a refrigerating machine having a refrigerated zone, an evaporator for abstracting heat from the zone, a condenser exteriorly of the zone, means for circulating refrigerant through the evaporator and condenser, and a thermostatic regulator having a heat-responsive element in heat transfer relation with the evaporator for controlling operation of the refrigerant circulating means, which method comprises initiating and terminating operation of the compressor, respectively, in response to predetermined high and low temperatures reflected by the heat-responsive element and transferring heat to said heat-responsive element at rates which vary with variations in the temperature of the air exteriorly of the zone, whereby the mean temperature of the evaporator is reduced and increased as the temperature of the air exteriorly of the refrigerated zone increases and decreases, respectively.

17. The method of controlling the operation of a refrigerator having a refrigerated compartment, an evaporator disposed in the compartment for abstracting heat therefrom, a condenser cooled by the air outside of said compartment, means for circulating refrigerant through the evaporator and condenser, and a thermostatic regulator for controlling operation of the refrigerant circulating means, said regulator having an element disposed in heat transfer relation with the evaporator, which method comprises initiating and terminating operation of the circulating means in response to predetermined high and low temperatures reflected by said element and modifying said initiation and termination of operation of the circulating means by transferring heat between the refrigerant and said temperature-responsive element before the refrigerant reaches the evaporator.

18. In refrigerating apparatus, the combination of an evaporator, means for condensing refrigerant vaporized in the evaporator, pressure-reducing means for conveying condensed refrigerant from the condensing means to the evaporator and including a conduit portion of small mass compared to the mass of the evaporator, and a thermostatic controller for controlling operation of the condensing means including a heat-responsive element disposed in heat transfer relation with said conduit portion.

LESLIE B. M. BUCHANAN.